Dec. 18, 1956  J. NAAB  2,774,639

PISTON RING EXPANDER

Filed Sept. 25, 1956

INVENTOR
JULIUS NAAB
BY
HIS ATTORNEY

United States Patent Office 2,774,639
Patented Dec. 18, 1956

2,774,639
PISTON RING EXPANDER

Julius Naab, Easton, Pa., assignor to Ingersoll-Rand Company, New York, N. Y., a corporation of New Jersey Application September 25, 1956, Serial No. 611,929

4 Claims. (Cl. 309—35)

This invention relates to improvements in pistons for air or gas compressors, engines or analogous mechanisms of the reciprocating type.

An object of the present invention is to provide a means of constantly maintaining a piston ring in contact with the cylinder wall including a spring constantly urging the ring radially outward against the walls of a piston chamber and the spring being prevented from expanding out of its peripheral groove and scoring the cylinder walls.

Figure 1:
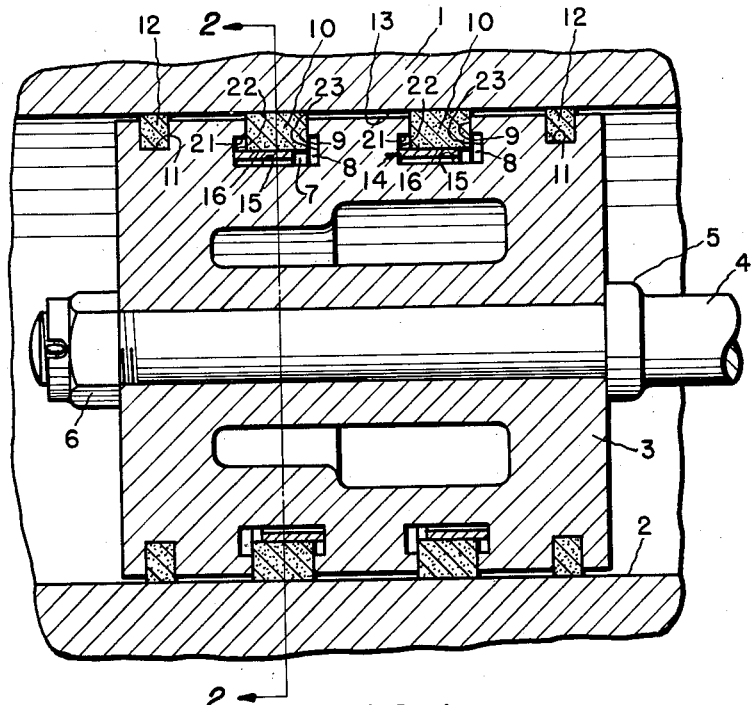
Figure 2:
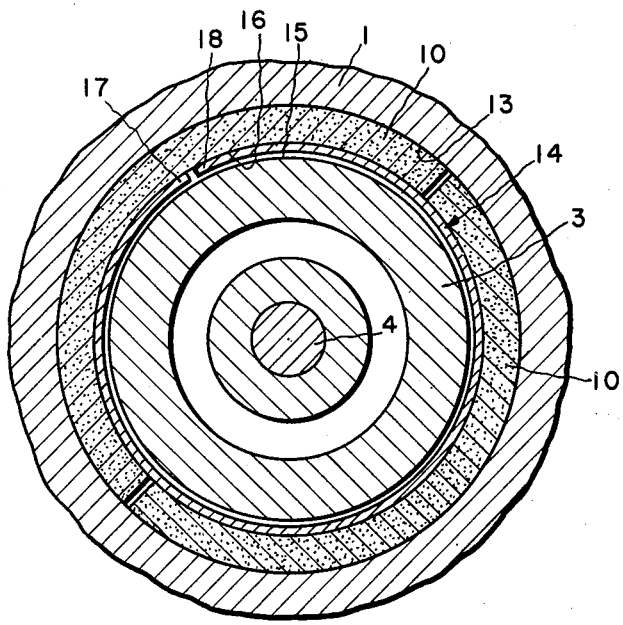
Figure 3:
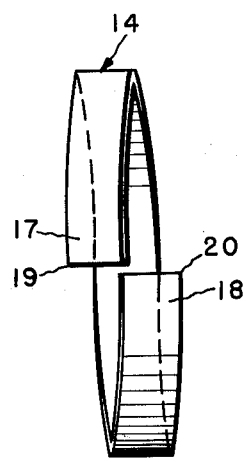

Other objects will become obvious from the following specification and drawings in which, Figure 1 is a longitudinal view, partly in section, of a compressor cylinder showing the piston constructed in accordance with this invention, Fig. 2 is a transverse section of the piston and the confronting cylinder walls, the section being taken on the line 2—2 of Fig. 1 looking in the direction indicated by the arrows, and Fig. 3 is a view of the piston ring spring taken at right angles to the axis.

Referring to the drawings, the numeral 1 indicates a cylinder of a compressor, although it is to be understood that the improved piston construction forming the present invention may be used in connection with any type of compressor, engine or other reciprocating mechanism without departing from the present invention.

The cylinder 1 has a piston 3 mounted in the piston chamber 2 thereof for reciprocatory movement. A piston rod 4 is connected to the piston 3 and held in place by means of a shoulder 5 of the piston rod 4 and a nut 6 screwed on the threaded end of the piston rod 4. The piston 3 has therein peripheral encircling grooves 11 for receiving bearing rings 12.

The piston 3 also has therein peripheral encircling grooves 7 T-shaped in cross section, each consisting of an inner slot or cross portion 8 of the T and a narrower outer slot or outer portion 9 of the T, radially outward from the cross portion 8. Said peripheral encircling grooves 7 are of uniform width.

In the accompanying drawing which shows a preferred embodiment of the invention, the piston 3 is of the non-lubricated type. In each groove 7 is located a self-lubricating type sealing ring 10. The most commonly used material in these rings is graphitized carbon, as shown, and the ring is split to permit assembly thereof on the piston. This material is subject to a wearing away when in use. In order to maintain close contact between the sealing ring 10 and the cylinder wall 13 and to compensate for the wearing away of the sealing ring 10, each sealing ring 10 is constantly urged radially outward against the cylinder wall 13 by a piston ring spring 14 which is located in the groove 7 between the bottom thereof and the inner side 16 of the ring 10.

The piston ring spring 14 shown is of the flat type and in order to be insertable into the peripheral encircling groove 7, it is split and its width is not greater than that of the outer slot 9 of the peripheral encircling groove 7.

The diameter of the spring 14 is substantially as great as or greater than the diameter of the piston 3 in order that it constantly urges the sealing ring 10 outward against the cylinder wall 13. When the sealing ring 10 has worn thin or has broken, it is necessary that the piston ring spring 14 be prevented from expanding out of the peripheral encircling groove 7 and scoring the cylinder wall 13.

In furtherance of this end, the two ends 17 and 18 of the spring in related position are misaligned in the direction of the axis of the spring 14. More particularly, the ends 17 and 18 of the ring 14 are misaligned to an extent that the distance between two parallel planes touching the opposite sides 19 and 20 of the spring 14 and at right angles to the axis of the spring 14 is greater than the width of the outer slot 9, so that when in place in the inner slot 8 of the groove 7, the spring can expand radially only until it abuts against the outer boundary 21 of the inner slot 8. The piston ring spring 14 when in place in the inner slot 8 of the peripheral encircling groove 7, bears partly on one side 22 of the inner slot 8 and partly on the opposite side 23 of the inner slot 8.

What is claimed is:

1. A piston having a peripheral encircling groove, said groove consisting of an inner slot and a narrower outer slot, a piston ring in the groove, a spring having a maximum width no greater than the width of said outer slot and a relaxed outer diameter at least as great as the outer diameter of the piston, said spring being located in said groove between the bottom thereof and the inner side of the ring constantly urging the ring radially outward, said spring being axially misaligned so that when in place in the inner slot of the groove the said spring can expand only until it abuts against the outer boundary of the inner slot.

2. A piston having a peripheral encircling groove of T-shaped cross section, the narrow portion of the groove being radially outward from the cross portion, a piston ring in the groove, a spring having a maximum width no greater than the width of such narrow portion and a relaxed outer diameter at least as great as the outer diameter of the piston, said spring being located in said groove between the bottom thereof and the inner side of the ring and constantly urging the ring radially outward, said spring being axially misaligned when in place in the inner portion of the groove so that the spring can expand only until it abuts against the outer boundary of said inner portion.

3. A piston having a peripheral encircling groove, said groove consisting of an inner slot and a narrower outer slot, a piston ring in the groove, a spring having a maximum width no greater than the width of said outer slot and a relaxed outer diameter substantially equal to the outer diameter of the piston, said spring being located in said groove between the bottom thereof and the inner side of the ring constantly urging the ring radially outward, said spring being axially misaligned in a relaxed position to an extent that the distance between two parallel planes touching the opposite sides of the spring and at right angles to the axis of the spring is greater than the width of the outer slot, so that when in place in the inner slot of the groove the spring can expand radially only until it abuts against the outer boundary of the inner slot.

4. A piston having a peripheral encircling groove, said groove consisting of an inner slot and a narrower outer slot, a piston ring in the groove, a flat split spring having a maximum width no greater than the width of said outer slot and a relaxed outer diameter at least as great as the outer diameter of the piston and having its ends misaligned in the direction of the axis of the spring, said spring being located in said groove between the bottom thereof and the inner side of the ring constantly urging the ring radially outward, said spring when in place in the inner slot of the groove bearing partly on one side of the inner slot of the groove and partly on the opposite side of the slot so that the spring can expand only until it abuts against the outer boundary of the inner slot.

No references cited.